United States Patent [19]

Shitanoki

[11] Patent Number: 4,840,078
[45] Date of Patent: Jun. 20, 1989

[54] STEERING DEVICE FOR VEHICLES

[75] Inventor: Kazuaki Shitanoki, Saitama, Japan

[73] Assignee: Honda Giken Kogyo Kabushiki Kaisha, Tokyo, Japan

[21] Appl. No.: 35,350

[22] Filed: Apr. 7, 1987

[30] Foreign Application Priority Data

Apr. 7, 1986 [JP] Japan .................................. 61-51677

[51] Int. Cl.⁴ .......................................... G05G 11/00
[52] U.S. Cl. ..................................... 74/484 R; 74/552
[58] Field of Search ................... 74/484 R, 552, 492; 200/61.54

[56] References Cited

U.S. PATENT DOCUMENTS

| | | | |
|---|---|---|---|
| 4,409,584 | 10/1983 | Arima et al. | 74/484 R |
| 4,422,699 | 12/1983 | Sakurai et al. | 339/3 S |
| 4,429,588 | 2/1984 | Emundts et al. | 74/484 R |
| 4,464,933 | 8/1984 | Santis | 74/484 R |
| 4,604,912 | 8/1986 | Sugita et al. | 74/484 R |
| 4,633,731 | 1/1987 | Kurata | 74/492 |

FOREIGN PATENT DOCUMENTS

| | | | |
|---|---|---|---|
| 1206696 | 2/1960 | France | 74/484 R |
| 57-37068 | 3/1982 | Japan | 74/484 R |
| 60-114048 | 8/1985 | Japan . | |

Primary Examiner—Leslie A. Braun
Assistant Examiner—Scott Anchell
Attorney, Agent, or Firm—Lyon & Lyon

[57] ABSTRACT

A steering device for a vehicle which comprises steering column members fixed to a body of the vehicle, a steering shaft rotatably mounted on the steering column members, a steering wheel fixedly connected to an upper end of the steering shaft, the steering wheel having first and second recesses, a receiving case member disposed coaxially with the steering shaft, the receiving case member being provided with first and third projections and rotatable together with the steering wheel by an engagement of the first projections and the first recess in the steering wheel, and a cancelling cam member disposed coaxially with respect to the steering shaft, the cancelling cam member being provided with a second projection that is engageable with the second recess in the steering wheel and with a third recess that is engageable with the third projection formed in the receiving case member, whereby the cancelling cam member is rotatable together with the steering wheel by the engagement between the second recess and the second projection and the engagement between the third recess and the third projection.

9 Claims, 2 Drawing Sheets

STEERING DEVICE FOR VEHICLES

BACKGROUND OF THE INVENTION

1. Field of the Invention

The present invention relates to a steering device for vehicles. More particularly, it relates to a steering device including a cam member for cancelling or disabling the operation of automotive turn signal switches, for improving an assembling or mounting work when the steering device is mounted on a motor vehicle.

2. Description of the Prior Art

Recently, a steering device for vehicles is provided on a steering wheel with various electric elements such as switches or electric instruments such as an air bag means. In such a steering device, an electric connecting means for maintaining an electric connection between the rotating steering wheel and a fixed member such as a steering column fixed to a vehicle body is inevitable.

For instance, Japanese Utility Model Laid-Open No. 60-114048 and U.S. Pat. No. 4,422,699 show automotive steering devices provided with such a connecting means.

This known steering device has a steering rotative unit that is rotatable together with a steering wheel and is disposed coaxially with a steering shaft, a steering non-rotative unit that is disposed coaxially with a steering shaft and is fixed to a vehicle body member such as a steering column, a combination switch means that is disposed coaxially with the steering shaft, is fixed to a vehicle body member and includes in combination turn signal switches and other switches, and a turn signal switch cancelling mechanism having an operating section provided on an inner wall of the combination switch means.

The steering rotative unit is provided with a rotative case that is rotatable together with the steering shaft. The non-rotative unit is provided with a stationary case. Both the cases are assembled slidably relative to each other and are adapted to define an annular receiving compartment that is coaxial with the steering shaft. Connectors are provided on the rotatable case and the fixed case, respectively. A flexible electric path in a spiral form is arranged coaxially with the steering shaft within the annular receiving compartment. Opposite ends of the flexible electric path are connected to the connectors.

In such a known steering device, a brushless electric signal transmission means is composed of the rotatable case, the fixed case, the flexible electric path and the connectors. The steering device is characterized in that the operating section of the turn signal switch cancelling mechanism is connected to or engaged with the rotatable case of the brushless electric signal transmission means so as to rotate together with the rotatable case.

However, in the steering device, since the rotatable member such as the rotatable case is interposed between the steering wheel and the operating section of the turn signal cancelling mechanism and serves as a rotational torque transmission means for driving the operating section, the turn signal switch cancelling mechanism is liable to be subjected to an excessive vibration from the movable member. Thus, if such a steering device is used for connecting means for keeping the electric connection operative in the vehicle, then the reliability and the durability will deteriorate. In order to solve this problem, the mechanical strength must be increased, resulting in an increase of the weight and the manufacture cost of the device.

Also, in assembling the known steering device, it is necessary to carry out an adjustment of the relative angular position between the cam member connected to the operating section of the turn signal switch cancelling mechanism and the steering wheel in the rotational directions of the steering shaft.

For example, FIG. 6 schematically shows a known steering device similar to the above-described steering device.

The steering device shown in FIG. 6 is composed of a steering shaft 12 rotatably inserted into a fixed member of a vehicle body such as a steering column 10, a steering wheel 11 coupled to an upper end of the steering shaft 12, a receiving case 14 that constitutes a brushless electric signal transmission means and is rotatable together with the steering wheel 11, a combination switch 13 and a cam member 15 serving as a turn signal switch cancelling mechanism.

In such a steering device, it is necessary to increase the signal transmission capacity corresponding to the increase in numbers of the electric elements and electric instruments on the steering wheel 11 as described before. Also, the receiving case 14 serving as the brushless electric signal transmission means is large in size and its dimension t axially of the steering shaft 12 is increased. For this reason, the cam member 15 for the turn signal switch cancellation is located at a deep position within a central hole of the receiving case 14. It would, therefore, be difficult to angularly position the cam member 15 relative to the steering wheel 11 in the rotational direction of the steering shaft 12. As a result, it would be necessary to position the cam member 15 in place relative to the steering wheel 11 using a special jig or tool.

As described above, the known devices suffer from a problem in assembling work.

SUMMARY OF THE INVENTION

In order to overcome the above-noted various defects inherent in the prior art, an object of the present invention is to provide a steering device for a vehicle, which is capable of transmitting a steering force directly to a cam member for turn signal cancellation and which is capable of readily being installed with a proper angular position of the cam member relative to a steering wheel.

Therefore, according to the present invention, there is provided a steering device for a vehicle, which comprises steering column members fixed to a body of the vehicle, a steering shaft rotatably mounted on the steering column members, a steering wheel fixedly connected to an upper end of the steering shaft, the steering wheel having a cylindrical boss member provided with first and second engaged means, a receiving case member disposed coaxially with the steering shaft, the receiving case member being provided with first and third engaging means, and the receiving case member being rotatable together with the steeering wheel by an engagement of the first engaging means and the first engaged means of the steering wheel, and a cancelling cam member disposed coaxially with respect to the steering shaft, the cancelling cam member being provided with a second engaging means that is engageable with the second engaged means formed in the boss member of the steering wheel and with a third engaged means that is engageable with the third engaging means formed in the receiving case member, whereby the cancelling cam member is rotatable together with the steering wheel by the engagement between the second engaged means and the second engaging means and the engagement between the third engaged means and the third engaging means. Furthermore, according to another aspect of the invention, the second engaged means formed in the boss member of the steering wheel and the third engaged means formed in the cancelling cam member have, respectively, displacement spaces in association with the second engaging means formed in the cancelling cam member and the third engaging means formed in the receiving case member. The displacement space of the second engaged means is smaller than the displacement space of the third engaged means.

DETAILED DESCRIPTION OF THE PREFERRED EMBODIMENTS

The present invention will now be described in detail by way of example with reference to the accompanying drawings.

Figure 1:
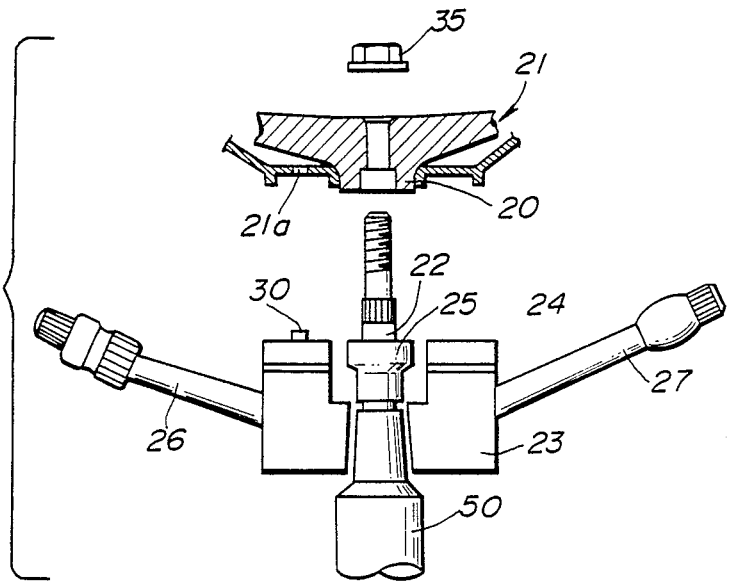
FIG. 1 is a schematic view showing an overall steering device for a vehicle in accordance with an embodiment of the invention.

FIG. 1 is a front elevational schematic view showing a steering device for an automotive vehicle and its associated members and components in accordance with the embodiment of the invention.

As shown in FIG. 1, a steering shaft 22 is rotatably mounted within a steering column member 50 that constitutes a part of a steering column fixed to a vehicle body. A steering wheel 21, a primary part of which is shown in FIG. 1, confronts an upper end of the steering shaft 22. The steering wheel 21 is engageable with the upper end of the steering shaft 22 through a nut 35 and a spline coupling so that the steering wheel 21 may be rotated together with the steering shaft 2. A steering gear mechanism (not shown) is connected to a lower end of the steering shaft 22. Around an outer peripheral of the steering shaft 22, there are coaxially provided a switch case 23 which has a through hole for the steering shaft 22 and which encases therein a combination switch mechanism incorporating turn signal switches, wiper switches and the like, a receiving case 24 which encases therein an electric signal transmission means, and a cancelling or disabling cam 25 for cancelling or disabling the turn signal switches, which cam 25 is substantially in the form of a cylinder. A pair of levers 26 and 27 are provided to extend diametrically from the switch case 23 on the left and right sides. A variety of kinds of switches are provided on the pair of levers 26 and 27. The various switches on the levers 26 and 27 are mechanically or electrically connected to the combination switch mechanism within the switch case 23 through the rod body of the levers 26 and 27. Thus, in the embodiment shown, the receiving case 24 is arranged closer to the steering wheel 21 than the switch case 23.

Figure 3:
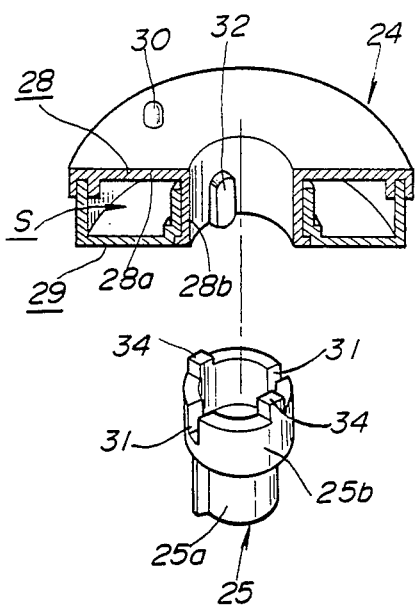
FIG. 3 is an exploded perspective view showing a receiving case and the cancelling cam shown in FIG. 1.

FIG. 3 is a partially perspective and cross-sectional view showing the above-described receiving case 24 and the cancelling cam 25.

As shown in FIG. 3, the receiving case 24 has therein a receiving space S defined by a movable annular member 28 rotatable together with the steering wheel 21 and a fixed annular member 29 fixed to a vehicle body member (not shown) such as the column member 50. More specifically, the movable annular member 28 is composed of a ring portion 28a concentric with respect to an axis of the steering shaft 22 and a hollow cylindrical portion 28b extending axially with respect to the steering shaft 22, thereby forming an inverted L-shape in cross-section.

The thus constructed movable annular member 28 and fixed annular member 29 are slidably coupled with each other while defining the above-described receiving space S therein. It should be noted that the fixed annular member 29 is held under the stationary condition relative to the vehicle body member, whereas the movable annular member 28 is rotatable in engagement with the steering wheel 21 and the cancelling cam 25 as described later. In the receiving space S, there is disposed the electric signal transmission means such as a flat cable (not shown) wound around the steering shaft 22 in a coaxial manner with respect to the steering shaft 22, such as, for example, the arrangements shown in the afore-mentioned Japanese Publication No. 60-114084 and U.S. Pat. No. 4,422,699. On the other hand, the cancelling cam 25 is composed of a hollow cylindrical member that has two stepped cylindrical parts 25a and 25b different in diameter. The steering shaft 22 may pass through the hollow space of the cancelling cam member 25. On an outer periphery of the cylindrical part 25a, there is formed a cam surface that is engageable with the turn signal switches (not shown) located on an inner circumferential surface of the switch case 23. Also, in assembling the steering device, the cylindrical part 25b is to be received in and surrounded by the hollow cylindrical portion 28b of the movable annular member 28. On a top end face of the cylindrical part 25b, there are equiangularly and alternatively formed a pair of convex projections 34 extending toward the steering wheel 21 and a pair of concave recesses 31 extending axially downwardly, that is, toward the lower end of the steering shaft 22.

Formed on a top surface of the ring portion 28a of the receiving case 24 is a positioning projection 30 that is inserted into or engaged with a hole 21a or concave recess formed in the vicinity of a boss portion 20 (see FIG. 1) of the steering wheel 21. On the inner circumferential surface, confronting the steering shaft 22, of the cylindrical part 28b, there are formed a pair of convex projections 32 that correspond to an are engaged with or inserted into the concave recesses 31 of the cancelling cam 25. Incidentally, one of the above described convex a projections 32 is shown in FIG. 3.

Figure 2:
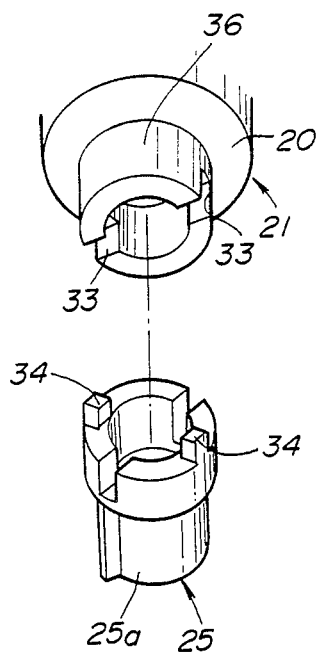
FIG. 2 is an exploded perspective view showing a steering wheel and a cancelling cam shown in FIG. 1.

FIG. 2 is a perspective view showing a detail of lower portion of the boss portion 20 of the steering wheel 21, which boss portion is to be engaged with the cancelling cam 25.

As shown in FIG. 2, a hollow cylindrical portion 36 extends axially downwardly from the lower end face of the boss portion 20 of the steering wheel 21. A pair of concave recesses 33 are formed in a lower end face of the cylindrical portion 36, and are corresponding to and engaged with or inserted into the pair of convex porjections 34 of the cancelling cam 25.

It is apparent that the recesses 33 may be formed directly in the bottom face of the boss portion 20.

Figure 4A:
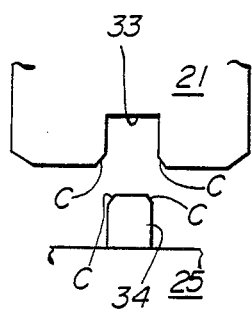
FIGS. 4a and 4b are enlarged views showing the primary parts of the steering wheel and the cancelling cam, shown in FIG. 2, in dismounted and assembled conditions.
Figure 4B:
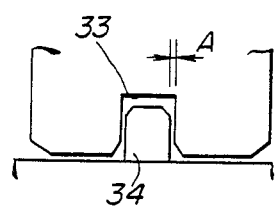
Figure 5A:
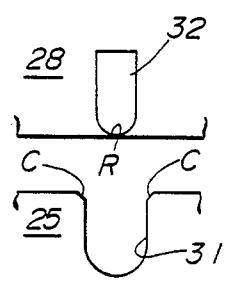
FIGS. 5a and 5b are enlarged views showing the primary parts of the receiving case and the cancelling cam, shown in FIG. 3, in dismounted and assembled conditions.
Figure 5B:
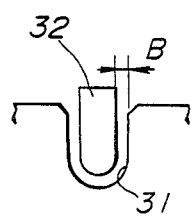
Figure 6:
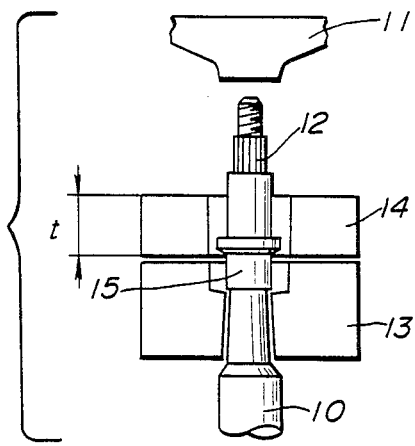
FIG. 6 is a schematic view showing an overall steering device for a vehicle accordance to the prior art.

Also, in the embodiment, as shown in FIGS. 5a and 5b, respective associated corners of the convex projections 32 of the movable annular member 28 and the concave recesses 31 of the cancelling cam 25 are rounded as indicated by character and bevelled as indicated by character C, for the sake of facilitation of insertion or engagement. Also, as shown in FIG. 5b, the convex projection 32 and the concave recesses 31 are designed so that they are engaged with each other with a predetermined space B, i.e., a displacement. On the other hand, as shown in FIGS. 4a and 4b, the concave recesses 33 of the lower end portion of the boss portion 20 of the steering wheel 21 and the convex projections 34 of the cancelling cam 25 are subjected to bevels C for facilitation of the engagement therebetween. Also, as shown in FIG. 4b, the concave recesses 33 and convex projections 34 are designed so that they are engaged with each other with a predetermined dimensional space A, i.e., a displacement.

The thus constructed steering device in accordance with the embodiment of the invention will be assembled in the following order, for example.

After the switch case 23 has been assembled and fixed to a predetermined member such as the steering column 50 or the like, the cancelling cam 25 is inserted into the steering shaft 22. At this time, the cylindrical part 25a of the cancelling cam 25 is positioned inside the switch case 23. Thereafter, the receiving case 24 is mounted on the switch case 23. In this case, the fixed annular member 29 is fixed to the stationary member such as the steering column 50, and the movable annular member 28 is held with its convex projections 32 engaged with or inserted into the concave recesses 31 of the cancelling cam 25. Subsequently, when the steering wheel 21 is mounted on the upper end of the steering shaft 22, while the steering wheel 21 is being inserted into the steering shaft 22, the positioning projection 30 of the movable annular member 28 of the receiving case 24 is inserted into or engaged with the hole 21a or concave recess formed in the vicinity of the boss portion 20 of the steering wheel 21. Thereafter, the nut 35 is fastened to the upper end threaded portion of the steering shaft 22, thus completing the assembling work. During the assembling work, since a predetermined positional relation has been established between the receiving case 24 and the cancelling cam 25 by the engagement between the convex projections 32 of the movable annular member 28 and the concave recesses 31 of the cancelling cam 25, it is possible to engage or insert the convex projections 34 of the cancelling cam 25 with or into the concave recesses 33 of the steering wheel 21 simultaneously with the engagement between the hole 21a of the steering wheel 21 and the convex projection 30 of the receiving case 24.

Since the cancelling cam 25 may be engaged with the steering wheel 21 under a regular or exact positional relation, such a troublesome positional adjustment that the cancelling cam 25 is rotated relative to the steering wheel 21 as in the prior art may be dispensed with. This makes it possible to improve the assembling work.

Furthermore, as explained in conjunction with FIGS. 4 and 5, the space A between the concave recesses 33 of the steering wheel 21 and the convex projection 34 of the cancelling cam 25 is smaller than the space B between the convex projection 32 of the receiving case 24 and the concave recesses 31 of the cancelling cam 25. Therefore, the steering force to be applied to the steering wheel 21 is directly transmitted from the steering wheel 21 to the cancelling cam 25. Accordingly, the operation of the cancelling cam 25 is not adversely affected by a possible damage or fault of the movable annular member 28. This makes it possible to enhance the operational reliability.

In the above described embodiment, convex projections and concave recesses are respectively employed as engaging means and engaged means in the corresponding engaging portions among the steering wheel, the receiving case and the cancelling cam. However, engaging means and engaged means of the present invention are not limited to such convex projections and concave recesses, respectively. For example, it is also acceptable that the engaging means is the concave recess and the engaged means is the convex projection according to the present invention.

I claim:

1. A steering device for a vehicle, comprising:
   steering column members fixed to a body of the vehicle;
   a steering shaft rotatably mounted on the steering column members;
   a steering wheel fixedly connected to an upper end of said steering shaft, said steering wheel having a cylindrical boss member provided with first and second engaged means;
   a receiving case member disposed coaxially with said steering shaft, said receiving case member being provided with first and third engaging means, and said receiving case member being rotatable together with said steering wheel by an engagement of said first engaging means and said first engaged means of said steering wheel; and
   a cancelling cam member disposed coaxially with respect to said steering shaft, said cancelling cam member being provided with a second engaging means that is engageable with said second engaged means formed in said boss member of said steering wheel and with a third engaged means that is engageable with said third engaging means formed in said receiving case member whereby said cancelling cam member is rotatable together with said steering wheel by the engagement between said second engaged means and said second engaging means and the engagement between said third engaged means and said third engaging means.

2. The steering device according to claim 1, wherein said second engaged means formed in the boss member of said steering wheel and said third engaged means formed in the cancelling cam member have, respectively, displacement spaces in association with said second engaging means formed in the cancelling cam member and said third engaging means formed in said receiving case member, and the displacement space of said second engaged means is smaller than the displacement space of said third engaged means.

3. The steering device according to claim 2, wherein said engaging means are convex projections and said engaged means are concave recesses formed in said corresponding members.

4. The steering device according to claim 2, wherein said engaging means are concave recesses and said engaged means are convex projections formed in said corresponding members.

5. A steering device for a vehicle, comprising:
steering column members fixed to a body of the vehicle;
a steering shaft rotatably mounted on the steering column members;
a steering wheel fixedly connected to an upper end of said steering shaft, said steering wheel having a cylindrical boss member provided with first and second engaged means;
a receiving case including a movable annular member disposed coaxially with said steering shaft and composed of a ring portion provided with a first engaging means and a hollow cylindrical portion provided with a third engaging means, a fixed annular member disposed coaxially with said steering shaft, said fixed annular member being slidably engageable with said movable annular member to define a receiving space therein and being fixed to said steering column members, whereby said movable annular member is rotatable together with said steering wheel by an engagement between said first engaging means and said first engaged means of said steering wheel; and
a cancelling cam member composed of a hollow cylindrical member whose upper half portion is disposed in a hollow section of said movable annular member, said steering shaft being rotatably insertable in a hollow section of said hollow cylindrical member, an upper end face of said hollow cylindrical member being provided with second engaging means that is engageable with said second engaged means formed in said boss member of said steering wheel and with third engaged means that is engageable with said third engaging means formed in said hollow cylindrical portion of said receiving case, whereby said cancelling cam member is rotatable together with said steering wheel by the engagement between said second engaged means and said second engaging means and the engagment between said third engaged means and said third engaging means.

6. The steering device according to claim 5 further comprising a switch case disposed coaxially with respect to said steering shaft, said switch case having a through hole having an inner circumferential surface confronting with a cam surface formed in a lower half portion of said cancelling cam member.

7. The steering device according to claim 6, wherein said second engaged means formed in the boss member of said steering wheel and said third engaged means formed in the cancelling cam member have, respectively, displacement spaces in association with said second engaging means formed in the cancelling cam member and said third engaging means formed in said receiving case, and the displacement space of said second engaged means is smaller than the displacement space of said third engaged means.

8. The steering device according to claim 7, wherein said engaging means are convex projections and said engaged means are concave recesses formed in said corresponding members.

9. The steering device according to claim 7, wherein said engaging means are concave recesses and said engaged means are convex projections formed in said corresponding members.

* * * * *